Nov. 27, 1962  J. DUBBURY ET AL  3,065,935
VERTICAL TAKE-OFF AIRCRAFT

Original Filed April 18, 1955  4 Sheets-Sheet 1

INVENTORS
J. DUBBURY
J. C. M. FROST
T. D. EARL
BY Maybee & Legris
ATTORNEYS.

Nov. 27, 1962   J. DUBBURY ET AL   3,065,935
VERTICAL TAKE-OFF AIRCRAFT
Original Filed April 18, 1955   4 Sheets-Sheet 3

INVENTORS
J. DUBBURY
J.C.M.FROST
T.D.EARL
BY Maybee & Legris
ATTORNEYS

United States Patent Office 3,065,935
Patented Nov. 27, 1962

3,065,935
VERTICAL TAKE-OFF AIRCRAFT
John Dubbury, Brampton, Ontario, John Carver Meadows Frost, Georgetown, Ontario, and Thomas Desmond Earl, Glen Williams, Ontario, Canada
Continuation of application Ser. No. 502,156, Apr. 18, 1955. This application Sept. 17, 1957, Ser. No. 684,615
Claims priority, application Great Britain Apr. 20, 1954
23 Claims. (Cl. 244—23)

This application is a continuation of our application Serial No. 502,156, filed April 18, 1955, now abandoned.

The invention relates to the propulsion and control of aircraft, particularly of aircraft of the general type disclosed in the co-pending United States patent application of John Carver Meadows Frost, Serial No. 376,320, filed on August 25, 1953.

The aforementioned co-pending application describes an aircraft which comprises a structure of generally lenticular form and which is sheathed by opposed aerofoil surfaces generally converging towards each other in an outboard direction from their central inboard portions to their perimetrical edges, and a radial flow gas turbine engine disposed between the said aerofoil surfaces and having a disc-like rotor the plane of rotation of which is approximately parallel to the medial plane between the said opposed surfaces. Air enters inlets provided in the aerofoil surfaces, then after passing through plenum chamber it flows radially outboardly through a double-sided multi-stage radial flow compressor of the gas turbine engine, then into an annularly disposed combustion system of the engine where it supports the combustion of the fuel and from which the products of combustion or gases expand through a radial flow turbine of the engine into a multiple jet-pipe assembly which directs the flow of gases to produce a forward propulsive thrust. The flight controls of that aircraft comprise hinged surfaces situated within the path of the propulsive jet.

The thrust/weight ratio of an aircraft of the type described in that application is such that the aircraft is capable of taking off, climbing and landing vertically without deriving any aerodynamic lift by virtue of its external form. To achieve such vertical flight however, the aircraft must assume an attitude whereby the plane of flight is disposed substantially vertically, that is to say, the plane of rotation of the engine rotor is vertical or nearly vertical, and this requirement presents certain design complications in the arrangement of landing gear and pilot's accommodation.

There are moreover several other features which are undesirable. The deflecting ducts or tail pipes are, of course, provided in order to direct the thrust gases, which are discharged radially around the periphery of the engine, so that they shall be discharged from the aircraft within a wide-angled sector having an angle of less than 180°, thus combining to apply the overall output of the engine to provide propulsive thrust; otherwise, diametrically opposed elements of the output would simply balance each other. However, the ducts add weight to the aircraft, and of necessity they are subjected to very high temperatures, thereby presenting structural and metallurgical problems.

Similarly, the hinged control surfaces operating within the jet stream are subject to very arduous conditions of temperature and of aerodynamic loading, and they add weight and complications to the aircraft.

A main object of the present invention is to provide means for controlling the direction of the jet discharged from the periphery of the engine, which will enable the aircraft to rise in a horizontal attitude, that is to say, in a direction perpendicular to the plane of rotation of the engine.

Another object of the invention is to provide means for selectively controlling the direction of the jet discharged from the periphery of the engine, thereby eliminating such potentially troublesome structural parts as the ducts or tail pipes, and the hinged surfaces.

A further object of the invention is to provide discharge jet control means which will enable the aircraft to rise vertically from the ground even if the thrust/weight ratio of the aircraft is less than one.

Still another object of the invention is to provide an improved method of propelling and controlling an aircraft, and of initiating its take-off.

The invention is based on a novel application of a phenomenon known as the "Coanda effect," whereby a jet of gas emerging from an orifice can be deflected to adhere to a surface situated obliquely to the axis of the jet. This effect can be demonstrated by holding a smoothly rounded edge of a plate of a given thickness adjacent a jet emerging from a slit or orifice having a width or "thickness" less than the thickness of the plate, the said edge being disposed substantially parallel to the length of the orifice; even though the plate is inclined obliquely to the plane of symmetry of the jet, the jet will be deflected around the edge of the plate and will adhere to the surface of the plate remote from the orifice. Under certain conditions the jet can be deflected through nearly 180° by this means. Air is entrained in an unobstructed jet, causing an apparent increase in the angular divergence of the jet as it leaves the orifice. If the entrainment on one side of the jet is obstructed in relation to the entrainment on the other side of the jet, the jet will be diverted and will adhere to the obstructed side. Conversely, if a contribution is made to the entrainment on one side of the jet, the jet will be diverted away from the side receiving the addition to the entrainment. In the first case the diversion of the jet is a result of the reduction of pressure between the jet and the obstruction. However, if other means are provided for introducing air between the jet and the obstruction the pressure difference will be destroyed and the jet will break away from the surface downstream of the point at which air was introduced.

The foregoing and other objects and advantages of the invention will become apparent from a study of the following specification, taken in conjunction with the accompanying drawings, in which like reference characters indicate corresponding parts throughout the several views, and in which.

In accordance with the invention the construction of an aircraft in a general manner may be similar to the construction described in the aforementioned application Serial No. 376,320, except that the aircraft of the present invention preferably is circular in plan form and the tail pipes and the hinged control surfaces are dispensed with. A discharge orifice extends peripherally around the aircraft, allowing the exhaust gases from the engine to be discharged in a radial direction uniformly around the periphery thereof. The peripheral discharge orifice is so constructed that in effect it is a perimetrical Coanda nozzle, and it is provided with means whereby the entrainment on one side of the orifice may be varied selectively at various sectors, and with means whereby various sectors of the orifice selectively may be obstructed in toto or in part. Thus by the selective adjustment of appropriate controls, the direction and magnitude of the jet emitted may be varied selectively in various sectors of the peripheral nozzle, to provide control of the aircraft.

For greater convenience throughout the description certain terms of positional relationship are used. The terms "outboard" (or "outboardly") "inboard" (or "inboardly") denote, respectively, greater and lesser distances from the axis of rotation of the rotor which constitutes the centre of the aircraft, and the terms "outer" and "inner" similarly denote greater and lesser distances from a medial plane of the aircraft coinciding with the plane of the rotor. Since the structural details of the aircraft and of its integral engine do not form part of the invention, they will not be described specifically.

Figure 1:
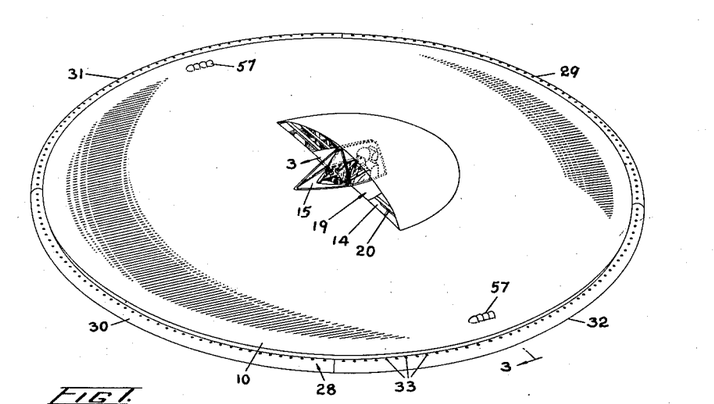
FIG. 1 is a perspective view of an aircraft constructed in accordance with the invention, and viewed from above.
Figure 2:
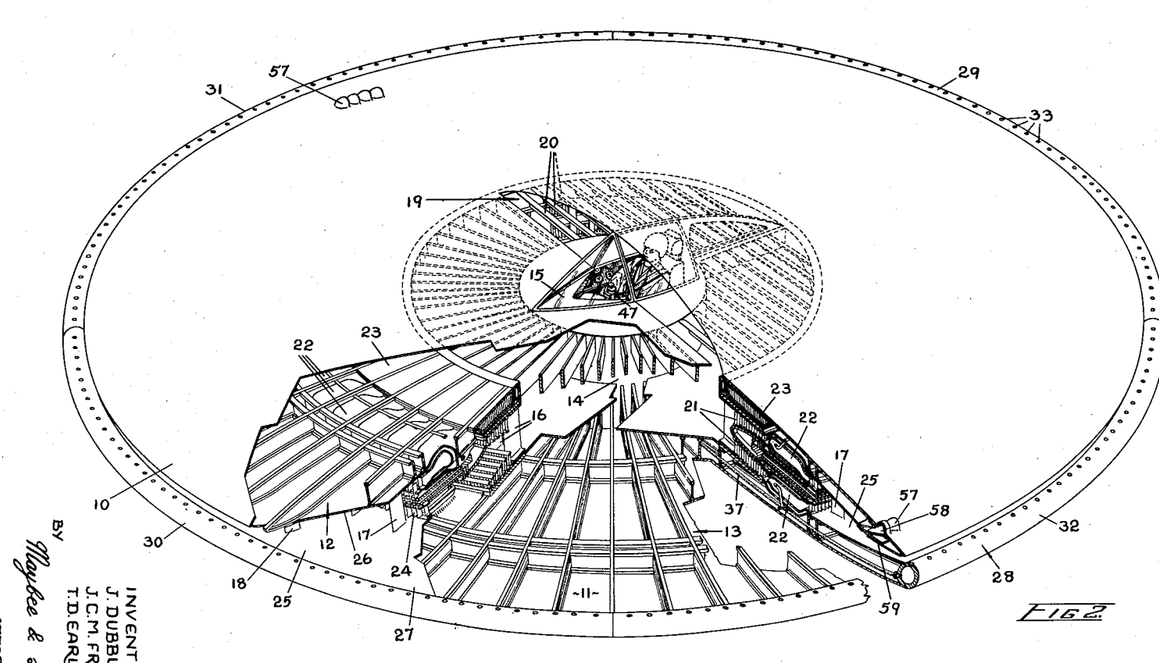
FIG. 2 is a perspective view of the said aircraft, partly broken away to show the internal construction.
Figure 3:
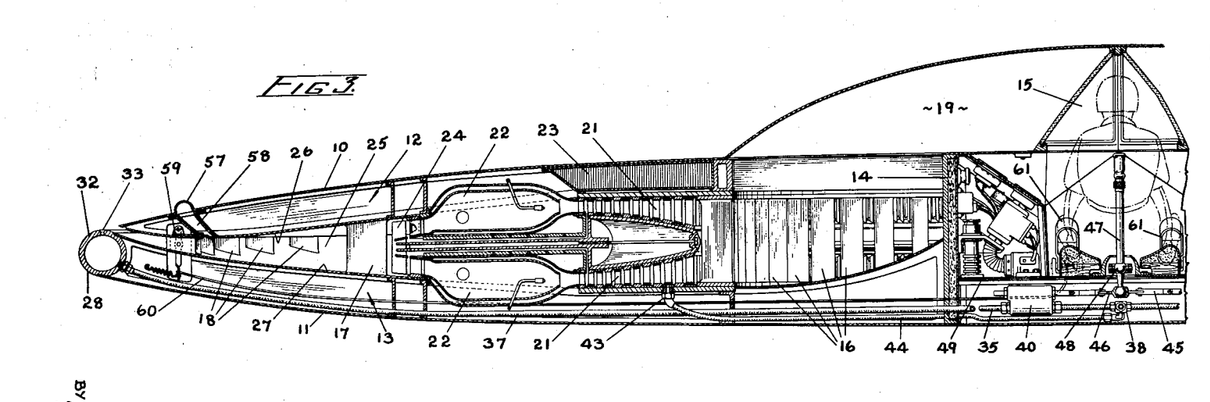
FIG. 3 is a radial sectional view taken substantially transversely of the direction of flight, and more particularly as indicated by lines 3—3 of FIG. 1.

The opposed aerofoil surfaces of the aircraft are constituted by upper skin 10 and lower skin 11, supported respectively on the outer edges of an upper series of ribs and spacers generally indicated at 12 and a lower series of ribs and spacers generally indicated at 13; the two series of ribs and spacers and the skins which they support are secured together in spaced relationship by a central cylindrical shell 14 within which is a pilot's compartment 15, and by a circumferentially arranged group of inboard struts 16 and two circumferentially arranged groups of outboard struts 17 and 18. Air enters an inlet 19 which is provided by the central protuberance in the upper skin 10, is deflected downwardly by cascades 20, then after passing through a central plenum chamber it flows radially outboardly through a double-sided multi-stage compressor 21, then into an annularly disposed combustion system 22 where it supports combustion of the fuel supplied from an annular fuel tank 23. The products of combustion expand through a single-stage radial flow turbine 24 into a peripheral outlet 25 defined by stator plates 26 and 27 secured respectively to the inner edges of the upper series of ribs 12 and of the lower series of ribs 13. The flow of the products of combustion through the outlet 25 is in generally radial directions. The compressor and the turbine have a common rotor which in the construction illustrated is supported by radial load and axial load air bearings.

The outboard ends of the lower series of ribs 13 are encompassed by a hollow toroidal element or bead generally indicated at 28. It will be observed particularly from FIGS. 2 and 3 of the drawings that the bead extends beyond the outboard periphery of the upper skin 10 and that its curved surface blends smoothly with the lower lip of the orifice 25 and also with the peripheral edge of the lower skin 13.

The bead 28 is divided into several independent sectors; in the embodiment of the invention illustrated there are four sectors, namely a rear sector 29, a front sector 30, a right sector 31 and a left sector 32; the sectors are disposed in end-to-end relationship to provide together an annular control member.

Circumferentially spaced holes 33 are provided in the upper surface of the bead, and the chambers within each sector 29, 30, 31 and 32 are connected respectively by ducts 34, 35, 36 and 37 to a distributor 38 through valves 39, 40, 41 and 42 respectively. Air is bled at 43 from the compressor of the engine through a duct 44 to the distributor 38, and thus if a valve is open there is a flow of air from the compressor to the openings 33 of the particular sector to which the open valve is connected.

Figure 4:
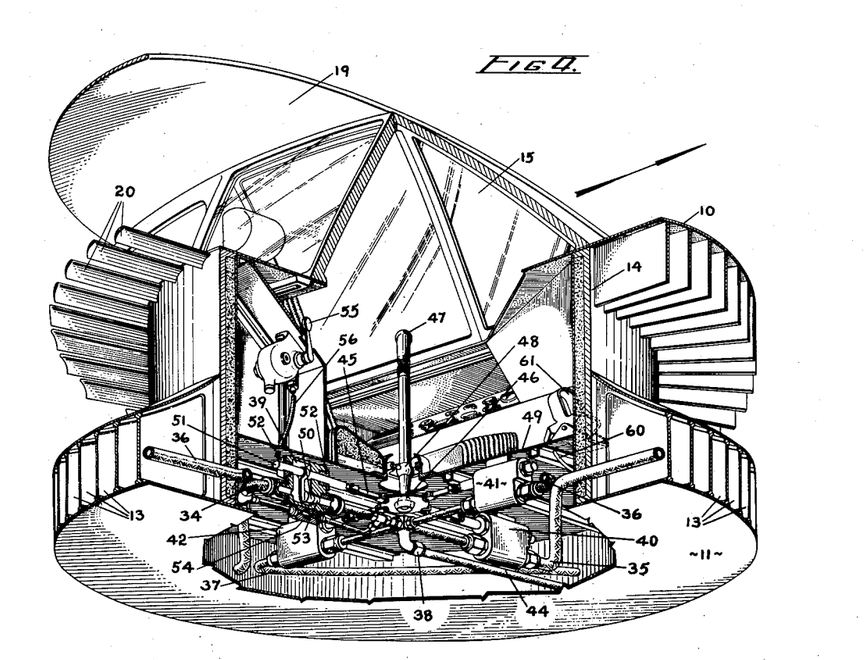
FIG. 4 is a fragmentary perspective view of the pilot's compartment, viewed from below, and showing particularly the pilot's control mechanism.

Since the four valves are similarly constructed, only valve 39 will be described. Each of the valves is connected by a rod and link mechanism which, in the case of valve 39 is identified by reference numeral 45, to a ball and socket fitting 46, the ball of which is the lower extremity of a pilot's control column 47. The control column is freely pivoted by means of a universal joint 48 fast to the cockpit floor 49.

Referring specifically to valve 39, a tapered plug 50 is supported by a rod 51 which is slidable in seals 52, and it co-acts with tapered inner walls of the valve casing to stop the flow of air from the distributor 38 to the duct 34, or to restrict the flow variably as desired. The plug has a cylindrical tip portion 53 and thus it is adapted to hold the valve in closed condition throughout that portion of its travel which is caused by the opening of the valve 40 oppositely disposed to it.

In parallel with the valve 39 is a by-pass valve 54 which is mechanically operated by a control lever 55 to which it is coupled by a flexible actuating cable 56. By means of this control air may be caused to flow from manifold 38 to sector 29 irrespective of the position of the pilot's control column 47, for a purpose which subsequently will be described. It will be noted that the valves 40, 41 and 42 are not provided with parallel by-pass valves.

Rearwardly directed louvres 57 are provided at diametrically opposite sides of the aircraft, and they are connected by ducts 58 to the engine outlet 25; thus a small fraction of the exhaust gases may be ejected to atmosphere through the louvres 57. The ducts may be opened or closed by sliding shutters 59 each of which is linked by a flexible actuating cable 60 to the respective rudder pedals 61. The sliding shutters operate differentially, and the resulting additional thrust component caused by the gases ejected through the louvres is sufficient to cause an unbalance of the forces about the yaw axis of the aircraft to provide directional control.

In operation, with the aircraft on the ground in a horizontal attitude, the pilot sets his controls in the neutral position of FIG. 4, so that no air is admitted to any of the holes 33 of the bead 28; because of the Coanda effect the jet of exhaust gases is deflected downwardly and the gases thus form a hollow column upon which the aircraft is supported. The thrust/weight ratio of the aircraft and the resultant "ground cushion" (as will be described) are such that the output of the engine is ample to lift the aircraft without any aerodynamic assistance. In fact, it has been found that within a limited distance from the ground, say one-half the diameter of the aircraft, the "ground cushion" allows the aircraft to be supported even though its total weight is much in excess of the static thrust developed by the engine. This phenomenon is believed to result from the fact that the hollow column or cylindrical sheet of downwardly directed high-speed gases provides a high pressure within the column; the pressure is great enough to support an aircraft whose weight is in excess of the static thrust of the engine. Actually, the cylindrical sheet or jet of gases on striking the ground is thought to be separated into two components, namely one which turns radially outboardly and another which turns radially inboardly. The inboardly directed stream forms a toroidal vortex, the effect of which is to produce an area of high pressure over the central region of the lower surface of the aircraft to form a "cushion" of high stability on which the aircraft is supported. The outer boundary of the toroidal vortex is confined within the cylindrical sheet of gases from which there is a constant transfer of energy into the vortex to maintain support of the aircraft. The effect of this "ground cushion" increases as the distance from the ground decreases, and it is such that at a distance from the ground of one-tenth the diameter of the aircraft, the aircraft will be supported even though its weight is substantially twice the statice thrust of the engine. Known methods of vertical take-off provide a solid column of downwardly directed gases, and the ground effect will reduce the "lift" below the static thrust of the engine when the nozzle is near to the ground.

Because of the construction and of the phenomenon described, the pilot by controlling the engine output is able to raise the aircraft from the ground in vertical ascent, while the aircraft retains a horizontal attitude. By further manipulation of the pilot's control column 47 air may be emitted through the holes 33 in any selected sector of the bead 28, and as hereinbefore explained the jet of exhaust gases emerging over the selected sector will break away from the surface of the bead and will develop an outboardly directed horizontal component of thrust while the remainder of the jet (that is, that which passes over sectors of the bead to the holes of which air is not being emitted) will continue to be subject to the Coanda effect and will produce a downwardly extending sheet of high-speed gases.

In order to transfer to forward flight, the pilot moves the control lever 55 so that the by-pass valve 54 is gradually opened thereby admitting air to the holes in the rear sector 29 of the bead, thus destroying the tendency to "coand" and producing a rearwardly directed horizontal component of thrust; the resultant thrust is in the sense of the selected sector, and the aircraft moves in the opposite sense. Once forward speed has reached a point where the aerodynamic forces on the aerofoil will support the aircraft, the control lever 55 may be returned to its original position. As the aircraft moves through the air, the exhaust gases will be influenced by the dynamic pressure of the air; the gases issuing from the various sectors will be bent rearwardly, i.e. become "wrapped under," and exert a substantial portion of the thrust in that direction.

Figure 5:
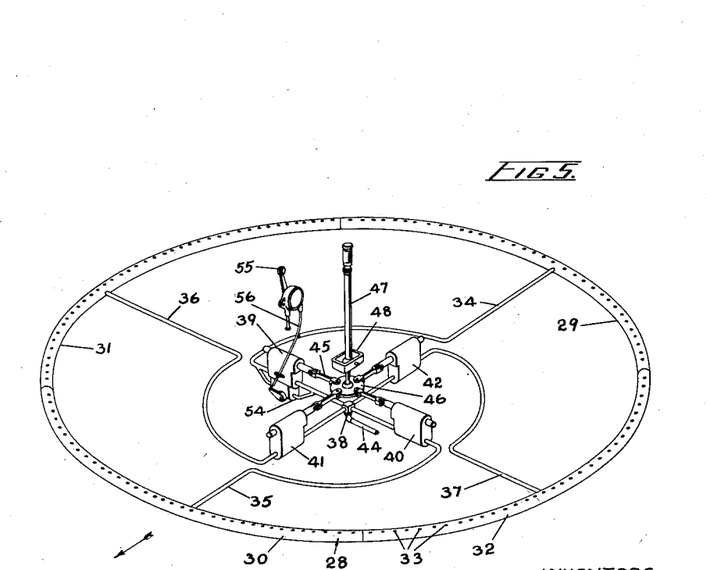
FIG. 5 is a schematic view showing the interrelation between the pilot's control mechanism and the peripheral controls of the aircraft.

It will be understood that the component of thrust in the horizontal and vertical directions may be varied by suitable manipulation of the control column 47 to vary selectively the amount of air emitted through the holes 33 of the individual sectors 29, 30, 31 and 32. It will be noted from FIG. 5 that the valves 39, 40, 41 and 42 are led in a clockwise direction to connect respectively with the sectors of the bead 28 over which pass the exhaust gases whose resultant direction of horizontal thrust is disposed 90° from the axis of the valves to which the respective sectors are connected. This construction is made necessary by reason of the gyroscopic effect of the radial engine on any forces which are applied parallel to the axis of rotation and spaced from it. Banked turns can be effected by the manipulation of the pedals 61 to open or close the shutters 59 for the louvres 57 and by manipulation of the control column 47 to cause emission of gases to the holes 33 in the rear or front sectors 29 or 30 as may be necessary to locally break down the Coanda effect and thus apply an appropriate pitching couple to the aircraft. The incidence of the aircraft to the axis of flight may be controlled by the admission of air as required to the lateral sectors 31 and 32 thereby locally breaking down the Coanda effect to apply a rolling couple to the aircraft.

In order to better describe the control of the aircraft, four typical control operations are submitted below. It is assumed in each of the four cases that the aircraft is flying at normal cruising speed, the control column 47 thus being at the neutral position illustrated in FIG. 4 so that no air is being emitted through the holes 33 of any of the four sectors. The jet at the rear is streaming substantially horizontally but with a slight downward component of thrust; the forward jet is "wrapped under" and is directed aft with a slight downward component of thrust; the jets from the two lateral sectors also are "wrapped under" and they are directed aft with a slight downward component of thrust.

(1) *To Correct Right Side Drop*

It will be necessary to apply an up force to the front portion of the aircraft or a down force to the rear portion in order to stabilize the aircraft. Consequently the control 47 will be moved to the left for corrective action thus opening the right valve 39 and supplying air to the rear sector 29. The portion of the jet ejected over the rear sector will then have no tendency to "coand" and its downward component of thrust will be removed. This will, in effect, apply a down force at the rear and stabilize the aircraft.

(2) *To Correct Left Side Drop*

It will be necessary to apply an up force to the rear portion of the aircraft or a down force to the front portion in order to stabilize the aircraft. The control handle 47 will be moved to the right for corrective action thus opening the left valve 40 and supplying air to the front sector 30. The porton of the jet ejected over the front sector will tend to "unwrap" thus increasing the suction on the undersurface of the aircraft near the front edge and resulting in a down force at the front portion of the aircraft which stabilizes the aircraft.

(3) *To Correct Rear Drop*

It will be necessary to apply an up force to the right portion of the aircraft or a down force to the left portion in order to stabilize the aircraft. The control handle 47 must be moved forwardly for corrective action thus opening the valve 42 and supplying air to the left sector 32. The jet ejected over the left sector will "unwrap" and there will be no downward component of thrust. The aircraft thus will be stabilized due to the down force which is applied to the left portion.

(4) *To Correct Front Drop*

It will be necessary to apply an up force to the left side of the aircraft or a down force to the right side. To effect this the control handle 47 will be moved aft for corrective action thus opening the front valve 41 and supplying air to the right sector 31. The jet passing over the right sector will "unwrap" and all downward component of thrust will be removed. This will, in effect, apply a down force to the right portion of the aircraft and stabilize it.

It will be understood that the toroidal element 28, which may be exposed to high temperatures and aerodynamic loading due to its location relative to the jet, can be of light yet robust construction. The control of the aircraft by the selective variation of the Coanda effect, as described herein, makes it possible to design a truly circular aircraft to the elimination of almost all structure not essential to the structure of the engine per se and to the accommodation of the pilot and his equipment and armament. Furthermore the necessity of an undercarriage is eliminated, as are other design problems associated with take-off and flight with an aircraft in a vertical attitude. Finally, design and production are greatly simplified by the symmetry and uniformity of the circular arrangement, making it possible to define the whole aircraft (other than its central core) by the definition of one sector.

The forms of the invention herein shown and described are to be considered merely as examples. The details of construction of the engine and its supporting structure do not form part of the invention. The control system proposed is by way of example only and is not an essential part of the invention. Obviously many changes in the invention not only are possible but may be desirable in order that the aircraft may have optimum performance. Such changes may, of course, be made without departing from the spirit of the invention or the scope of the subjoined claims.

What we claim as our invention is:

1. An aircraft comprising a structure of generally lenticular form and which is sheathed by opposed aerofoil surfaces which provide lift developing surfaces, engine means witihn the structure and embodying an air displacement passage having an intake end and a peripheral outlet which is adjacent the perimeter of the structure and from which the air is ejected in generally radial directions, and adjustable means encompassing the outlet and operable to selectively alter the direction of flow of the ejected air so that at least some of the air, as it is being ejected from the outlet, flows in directions generally parallel to the yaw axis of the aircraft and in a downward sense to form a moving tubular curtain of gas which provides thrust on said aircraft in the direction of said axis.

2. An aircraft comprising a structure of generally lenticular form and which is sheathed by opposed aerofoil surfaces which provide lift developing surfaces, engine means within the structure and embodying an air displacement passage having an intake end and a peripheral outlet which is adjacent the perimeter of the structure and from which the air is ejected in generally radial directions, a plurality of control sectors arranged around the engine outlet and disposed in end-to-end relationship to provide together an annular control member, each control sector including adjustable operable means to selectively alter the direction of flow of the ejected air so that at least some of the air, as it is being ejected from the outlet, flows in directions generally parallel to the yaw axis of the aircraft and in a downward sense to form a moving tubular curtain of gas which provides thrust on said aircraft in the direction of said axis, and means to separately control the adjustable means of each control sector.

3. An aircraft comprising a structure of generally lenticular form and which is sheathed by opposed aerofoil surfaces which provide lift developing surfaces, engine means within the structure and embodying an air displacement passage having an intake end and a peripheral outlet which is adjacent the perimeter of the structure and from which the air is ejected in generally radial directions, and a perimetrical Coanda nozzle encompassing the outlet to alter the direction of flow of the ejected air.

4. An aircraft comprising a structure of generally lenticular form and which is sheathed by opposed aerofoil surfaces which provide lift developing surfaces, engine means within the structure and embodying an air displacement passage having an intake end and a peripheral outlet which is adjacent the perimeter of the structure and from which the air is ejected in generally radial directions, a perimetrical Coanda nozzle encompassing the outlet to direct the flow of the ejected air, and means cooperating with the Coanda nozzle to modify the operating characteristics of the nozzle and thus vary the direction of flow of the ejected air.

5. An aircraft comprising a structure of generally lenticular form and which is sheathed by opposed aerofoil surfaces which provide lift developing surfaces, engine means within the structure and embodying an air displacement passage having an intake end and a peripheral outlet which is adjacent the perimeter of the structure and from which the air is ejected in generally radial directions, a plurality of control sectors arranged around the engine outlet and disposed in end-to-end relationship to provide together an annular control member, each control sector including a Coanda nozzle through which the air ejected from the engine outlet is discharged and also including adjustable means to selectively alter the direction of flow of the ejected air, and means to control separately the adjustable means of each control sector.

6. An aircraft comprising a structure of generally lenticular form and which is sheathed by opposed aerofoil surfaces which provide lift developing surfaces, engine means within the structure and embodying an air displacement passage having an intake end and a peripheral outlet which is adjacent the perimeter of the structure and from which the air is ejected in generally radial directions, and means encompassing the outlet and adjustable to direct the flow of the ejected air in a direction substantially normal to the medial plane between the aerofoil surfaces to provide a cylindrical sheet of moving air the reaction of which against the aircraft together with the force of the air within it support the aircraft.

7. An aircraft comprising a structure of generally lenticular form and which is sheathed by opposed upper and lower aerofoil surfaces which provide lift developing surfaces, a hollow toroidal element perimetrically encompassing the aerofoil surfaces, the lower aerofoil surface blending with the lower surface of the toroidal element, engine means within the structure and embodying an air displacement passage having an intake end and a peripheral outlet from which the air is ejected in generally radial directions, a perimetrical Coanda nozzle registering with the peripheral engine outlet and including a gap defined by the upper surface of the toroidal element and the perimeter of the upper aerofoil surface, and means of the Coanda nozzle to alter the direction of flow of the air ejected through the nozzle.

8. An aircraft comprising a body structure, a gas displacement passage in the structure having an intake and having a substantially annular outlet adjacent to the periphery of the structure, means for impelling gas to flow through the passage from the intake to the outlet in a plurality of centrifugal directions relative to the yaw axis of the aircraft and to eject the gas at high velocity from the outlet generally radially of the yaw axis and at a multiplicity of positions distributed around said periphery, and gas directing means associated with the outlet and adjustable to selectively alter the directions in which the gas leaves the outlet, the directing means being operable to change the direction of flow of at least some of the gas, as it is being ejected from the outlet, so that it flows in directions generally parallel to the yaw axis and in a downward sense to form a moving tubular curtain of gas which provides thrust on said aircraft in the direction of said axis.

9. An aircraft as defined in claim 8, wherein the body structure is of generally lenticular form and is sheathed by opposed aerofoil surfaces which provide lift developing surfaces, and wherein said periphery is the circumferential edge portion of the structure.

10. An aircraft comprising a body structure, a gas displacement passage in the structure having an intake and having a substantially annular outlet adjacent to the periphery of the structure, means for impelling gas to flow through the passage from the intake to the outlet in a plurality of centrifugal directions relative to the yaw axis of the aircraft and to eject the gas at high velocity from the outlet generally radially of the yaw axis, gas directing means associated with the outlet and adjustable to selectively alter the directions in which the gas leaves the outlet, the directing means being operable to change the direction of flow of at least some of the gas, as it is being ejected from the outlet, to flow toward the ground and generally normal thereto to define a tubular curtain of gas, the directing means being so positioned that a portion of the aircraft substantially closes the upper end of the tube defined by the curtain, whereby, when the aircraft is adjacent to the ground, gas pressure is built up within the tubular curtain by some of the gas confined therein between the aircraft and the ground and at least partially sustains the aircraft above the ground.

11. An aircraft as defined in claim 10, wherein the body structure is of generally lenticular form and is sheathed by opposed aerofoil surfaces which provide lift developing surfaces, and wherein said periphery is the circumferential edge portion of the structure.

12. An aircraft comprising, means for ejecting gases at high velocity through a substantially annular nozzle adjacent to the outboard periphery of the aircraft, the nozzle being directed so that the gases are normally ejected in directions generally radial of the yaw axis of the aircraft and at a multiplicity of positions distributed about said periphery, and gas directing means associated with the nozzle and adjustable to selectively alter the directions in which the gas leaves the nozzle, the directing means being operable to change the direction of flow of at least some of the gases, as they are being ejected from the nozzle, so that they flow in directions generally parallel to the yaw axis and in a downward sense to form a moving tubular curtain of gas which provides thrust on said aircraft in the direction of said axis.

13. An aircraft as defined in claim 12, wherein said aircraft is of generally lenticular form and is sheathed by opposed aerofoil surfaces which provide lift developing surfaces and wherein the outboard periphery is a circumferential edge portion of the aircraft.

14. An aircraft comprising, means for ejecting gases at high velocity through a substantially annular nozzle adjacent to the outboard periphery of the aircraft, the nozzle being directed so that the gases are normally ejected in directions generally radial of the yaw axis of the aircraft and at a multiplicity of positions distributed about said periphery, and gas directing means associated with the nozzle and adjustable to selectively alter the directions in which the gases leave the nozzle, the directing means being operable to change the direction of flow of at least some of the gases, as they are being ejected from the nozzle, so that they flow in a stream towards the ground and generally perpendicular thereto and are confined to define a moving tubular curtain of gas, the directing means being so positioned that a portion of the aircraft substantially closes the upper end of the tube defined by the curtain, whereby, when the aircraft is adjacent to the ground, gas pressure is built up within the tubular curtain by some of the gas confined therein between said aircraft and the ground and at least partially sustains the aircraft above the ground.

15. An aircraft as defined in claim 14, wherein said aircraft is of generally lenticular form and is sheathed by opposed aerofoil surfaces which provide lift developing surfaces and wherein the outboard periphery is a circumferential edge portion of the aircraft.

16. An aircraft comprising means for ejecting propulsive gases at high velocity from the aircraft in generally radial directions and through an annular nozzle having a central body and gas directing means adjustable to selectively alter the directions in which the gases leave the aircraft, the directing means being operable to direct the gases, upon ejection from the aircraft, in a downward stream to form a tubular curtain of gas parallel to the yaw axis of the aircraft, the central body closing the upper end of the tube defined by the curtain whereby, when the aircraft is adjacent to the ground, gas pressure is built up between the central body and the ground by some of the gas curling under the central body and at least partially sustains the aircraft above the ground.

17. An aircraft comprising a body structure, a gas displacement passage in the structure having an intake and having a substantially annular outlet adjacent to the periphery of the structure, means for impelling gas to flow through the passage from the intake to the outlet in a plurality of centrifugal directions relative to the yaw axis of the aircraft, and gas directing means associated with the outlet to alter the direction of flow of at least some of the gas leaving the outlet so that such gas flows away from the aircraft in a downward sense in directions generally parallel to the law axis, the said gas directing means also providing means which define the gas flowing out of the outlet into a moving tubular curtain which provides thrust on the aircraft in the direction of said axis.

18. An aircraft comprising a body structure sheathed by opposed aerofoil surfaces which provide lift-developing surfaces, a gas displacement passage in the structure having an intake and having a substantially annular outlet adjacent to the periphery of the structure, means for impelling gas to flow through the passage from the intake to the outlet in a plurality of centrifugal directions relative to the yaw axis of the aircraft, and gas directing means associated with the outlet to alter the direction of flow of at least some of the gas leaving the outlet so that such gas flows away from the aircraft in a downward sense in directions generally parallel to the law axis, the said gas directing means also providing means which define the gas flowing out of the outlet into a moving tubular curtain which provides thrust on the aircraft in the direction of said axis.

19. An aircraft comprising a body structure, a gas displacement passage in the structure having an intake and having a substantially annular outlet adjacent to the periphery of the structure, an annular nozzle having a central body and communicating with the outlet, means for impelling gas to flow through the passage from the intake to the outlet in a plurality of centrifugal directions relative to the yaw axis of the aircraft, and gas directing means associated with the nozzle to alter the direction of flow of at least some of the gas leaving the outlet so that such gas, after leaving the nozzle, flows away from the aircraft in a downward sense in directions generally parallel to the yaw axis, the said gas directing means also providing means which define the gas flowing out of the outlet into a moving tubular curtain of gas, the central body closing the upper end of the tube defined by the curtain whereby, when the aircraft is adjacent to the ground, gas pressure is built up between the central body and the ground by some of the gas curling under the central body and at least partially sustains the aircraft above the ground.

20. An aircraft comprising a body structure sheathed by opposed aerofoil surfaces which provide lift-developing surfaces, a gas displacement passage in the structure having an intake and having a substantially annular outlet adjacent to the periphery of the structure, an annular nozzle having a central body and communicating with the outlet, means for impelling gas to flow through the passage from the intake to the outlet in a plurality of centrifugal directions relative to the yaw axis of the aircraft, and gas directing means associated with the nozzle to alter the direction of flow of at least some of the gas leaving the outlet so that such gas, after leaving the nozzle, flows away from the aircraft in a downward sense in directions generally parallel to the yaw axis, the said gas directing means also providing means which define the gas flowing out of the outlet into a moving tubular curtain of gas, the central body closing the upper end of the tube defined by the curtain whereby, when the aircraft is adjacent to the ground, gas pressure is built up between the central body and the ground by some of the gas curling under the central body and at least partially sustains the aircraft above the ground.

21. An aircraft comprising a body structure, an annular nozzle on the structure adjacent to the periphery thereof and having a central body, a gas displacement passage in the structure and extending between an intake and the nozzle, means for impelling gas to flow through the passage from the intake to the nozzle in a plurality of centrifugal directions relative to the yaw axis of the aircraft, and gas directing means associated with the nozzle to direct at least some of the gas leaving the nozzle to flow away from the aircraft in a downward sense in directions generally parallel to the yaw axis, the said gas directing means also providing means which define the gas flowing out of the outlet into a moving tubular curtain of gas, the central body closing the upper end of the tube defined by the curtain whereby, when the aircraft is adjacent to the ground, gas pressure is built up between the central body and the ground by some of the gas curling under the central body and at least partially sustains the aircraft above the ground.

22. An aircraft comprising a body structure sheathed by opposed aerofoil surfaces which provide lift-developing surfaces, an annular nozzle on the structure adjacent to the periphery thereof and having a central body, a gas displacement passage in the structure and extending between an intake and the nozzle, means for impelling gas to flow through the passage from the intake to the nozzle in a plurality of centrifugal directions relative to the yaw axis of the aircraft, and gas directing means associated with the nozzle to direct at least some of the gas leaving the nozzle to flow away from the aircraft in a downward sense in directions generally parallel to the yaw axis, the said gas directing means also providing means which define the gas flowing out of the outlet into a moving tubular curtain of gas, the central body closing the upper end of the tube defined by the curtain whereby, when the aircraft is adjacent to the ground, gas pressure is built up between the central body and the ground by some of the gas curling under the central body and at least partially sustains the aircraft above the ground.

23. An aircraft comprising means for impelling propulsive gases at high velocity within the aircraft in generally centrifugal directions and ejecting the gases through an annular nozzle having a centerbody and means to direct the gases, upon ejection from the aircraft, in a downward stream to form a tubular curtain of gas parallel to the yaw axis of the aircraft, the centerbody closing the upper end of the tube defined by the curtain whereby, when the aircraft is adjacent to the ground, gas pressure is built up between the centerbody and the ground by some of the gas curling under the centerbody and at least partially sustains the aircraft above the ground.

References Cited in the file of this patent

UNITED STATES PATENTS

| | | |
|---|---|---|
| 1,724,226 | Sorensen | Aug. 13, 1929 |
| 2,444,318 | Warner | June 29, 1948 |
| 2,718,364 | Crabtree | Sept. 20, 1955 |
| 2,777,649 | Williams | Jan. 15, 1957 |
| 2,807,428 | Wilbault | Sept. 24, 1957 |

FOREIGN PATENTS

| | | |
|---|---|---|
| 770,874 | Great Britain | Mar. 27, 1957 |

UNITED STATES PATENT OFFICE
CERTIFICATE OF CORRECTION

Patent No. 3,065,935                              November 27, 1962

John Dubbury et al.

It is hereby certified that error appears in the above numbered patent requiring correction and that the said Letters Patent should read as corrected below.

In the grant, line 3, after "Canada," insert -- assignors, by mesne assignments, to Avro Aircraft Limited, of Malton Village Ontario, Canada, a corporation, --; lines 12 and 13, for "John Dubbury, John Carver Meadows Frost, and Thomas Desmond Earl, their heirs" read -- Avro Aircraft Limited, its successors --; and in the heading to the printed specification, line 5, after "Canada" insert -- , assignors, by mesne assignments, to Avro Aircraft Limited, Malton Village, Ontario, Canada, a corporation --.

Signed and sealed this 15th day of October 1963.

(SEAL)
Attest:
ERNEST W. SWIDER
Attesting Officer

EDWIN L. REYNOLDS
Acting Commissioner of Patents